US012565105B2

(12) United States Patent
Dagner et al.

(10) Patent No.: US 12,565,105 B2
(45) Date of Patent: Mar. 3, 2026

(54) METHOD FOR OPERATING A SOIL PROCESSING MACHINE

(71) Applicant: Hamm AG, Tirschenreuth (DE)

(72) Inventors: Josef Dagner, Altenstadt (DE); Stefan Braunschläger, Bärnau (DE); Michael Sperber, Waldsassen (DE)

(73) Assignee: Hamm AG, Tirschenreuth (DE)

( * ) Notice: Subject to any disclaimer, the term of this patent is extended or adjusted under 35 U.S.C. 154(b) by 703 days.

(21) Appl. No.: 17/969,840

(22) Filed: Oct. 20, 2022

(65) Prior Publication Data

US 2023/0126669 A1     Apr. 27, 2023

(30) Foreign Application Priority Data

Oct. 22, 2021     (DE) ..................... 10 2021 127 444.3

(51) Int. Cl.
    *B60L 1/00*          (2006.01)
    *B06B 1/16*          (2006.01)
    (Continued)

(52) U.S. Cl.
    CPC ................ *B60L 1/003* (2013.01); *B06B 1/16* (2013.01); *B60L 1/02* (2013.01); *B60L 1/14* (2013.01);
    (Continued)

(58) Field of Classification Search
    CPC .... B60L 1/003; B60L 1/02; B60L 1/14; B60L 15/2045; B60L 58/10; B60L 58/12; B60L 2200/40; B60L 2240/42; B60L 2240/54; B06B 1/16; E01C 19/286; E01C 21/00; E01C 19/23; H01M 10/48; H01M 2220/20; E02D 3/026; H02J 2310/52; H02J 2310/54; H02J 2310/56; H02J 2310/60; H02J 7/00304; H02J 7/0063; H02J 1/14

See application file for complete search history.

(56) References Cited

U.S. PATENT DOCUMENTS

2007/0288774 A1    12/2007   Tanaka
2010/0268407 A1    10/2010   Yanagisawa
          (Continued)

FOREIGN PATENT DOCUMENTS

EP        3588732       1/2020
JP      2007330016    12/2007
          (Continued)

OTHER PUBLICATIONS

German Search Report for German application No. DE 10 2021 127 444.3 dated Sep. 7, 2022, 10 pages German).

*Primary Examiner* — Rodney A Butler
(74) *Attorney, Agent, or Firm* — Rankin, Hill & Clark LLP

(57) ABSTRACT

In a method for operating a soil-working machine, in particular a soil compactor, wherein the soil-working machine (10) comprises a plurality of consumers of electrical energy fed from an energy store (58), a load state of the energy store (58) is registered and when the presence of a state of excessive load of the energy store (58) is detected, at least one consumer of electrical energy is deactivated and/or the power consumption of at least one consumer of electrical energy is reduced, and/or consumers of electrical energy are put into operation with a time offset in order to avoid entering a state of excessive load of the energy store (58).

11 Claims, 2 Drawing Sheets

(51) Int. Cl.

| | |
|---|---|
| *B60L 1/02* | (2006.01) |
| *B60L 1/14* | (2006.01) |
| *B60L 15/20* | (2006.01) |
| *B60L 58/10* | (2019.01) |
| *E01C 19/28* | (2006.01) |
| *H01M 10/48* | (2006.01) |
| *B60L 58/12* | (2019.01) |
| *E01C 21/00* | (2006.01) |
| *E02D 3/026* | (2006.01) |

(52) U.S. Cl.

CPC ........... *B60L 15/2045* (2013.01); *B60L 58/10* (2019.02); *E01C 19/286* (2013.01); *H01M 10/48* (2013.01); *B60L 58/12* (2019.02); *B60L 2200/40* (2013.01); *B60L 2240/42* (2013.01); *B60L 2240/54* (2013.01); *E01C 21/00* (2013.01); *E02D 3/026* (2013.01); *H01M 2220/20* (2013.01)

(56) References Cited

U.S. PATENT DOCUMENTS

| | | | |
|---|---|---|---|
| 2017/0342668 | A1 | 11/2017 | Meindl et al. |
| 2020/0190751 | A1* | 6/2020 | Wolfrum ............... E01C 19/286 |

FOREIGN PATENT DOCUMENTS

| | | |
|---|---|---|
| JP | 5220679 | 6/2013 |
| JP | 2017128880 | 7/2017 |
| JP | 2018136691 | 8/2018 |
| JP | 6700217 | 5/2020 |
| WO | 2015195236 | 12/2015 |
| WO | 2020174261 | 9/2020 |

* cited by examiner

METHOD FOR OPERATING A SOIL PROCESSING MACHINE

The present invention relates to a method for operating a soil processing machine.

In particular in the case of solely electric motor-driven soil processing machines, in which the energy for operating the electric motors provided thereon is taken from an energy store, such as one or more batteries, the operating time is limited by the energy storable in such an energy store. Furthermore, such energy stores are limited with regard to the current flow from them, i.e., with regard to the electric current generally referred to as battery current, so that they can only release a limited amount of energy per unit of time and make it available to the consumers of electrical energy in a soil processing machine.

It is the object of the present invention to provide a method for operating a soil processing machine, in particular a soil compactor, using which an overload of an energy store can be avoided.

According to the invention, this object is achieved by a method for operating a soil processing machine, in particular a soil compactor, wherein the soil processing machine comprises a plurality of consumers of electrical energy fed from an energy store, in which method:

a load state of the energy store is detected and then, when the presence of a state of excessive load of the energy store is detected, at least one consumer of electrical energy is deactivated and/or the power consumption of at least one consumer of electrical energy is reduced, and/or consumers of electrical energy are put into operation with a time delay to avoid entering into a state of excessive load of the energy store.

Using this method, by operating consumers of electrical energy in a soil processing machine using a power consumption or a coordinated power consumption such that the simultaneous operation or putting into operation of consumers that heavily load the energy storage device is avoided at least temporarily, the load on the energy storage device is kept at a level or limited to a level which, on the one hand, prevents damage to the energy store and, on the other hand, ensures efficient use of the energy stored in the energy store.

To provide information about the load of the energy store, a current flow from the energy store can be registered, wherein the presence of a state of excessive load on the energy store is detected when an amperage of the current flow from the energy store is above a threshold amperage. The amperage of the electric current presently flowing or a time-averaged amperage can be taken into consideration for this purpose.

In order to be able to continue to ensure that an overload of the energy storage device is avoided, taking into consideration the relief measures carried out using the method according to the invention, it is proposed that, if after deactivating at least one consumer of electrical energy and/or reducing the power consumption of at least one consumer of electrical energy, the presence of a state of excessive load of the energy store is still detected, at least one further consumer of electrical energy is deactivated and/or the power consumption of at least one further consumer of electrical energy is reduced.

To reduce the load of the energy store, for example, if a state of excessive load of the energy store is present, in accordance with a relief strategy taking into consideration the power consumption of consumers of electrical energy, consumers of electrical energy having decreasing power consumption can be successively deactivated and/or consumers of electrical energy having decreasing power consumption can be successively reduced in their power consumption, in such a way that consumers of electrical energy having higher power consumption are acted upon first and consumers of electrical energy having lower power consumption are acted upon if the load of the energy store is still excessive.

With such a relief strategy, which takes into consideration the load of the energy store generated by various consumers of electrical energy and in which consumers of electrical energy that load the energy store more strongly are to be acted on first, before consumers of electrical energy that load the energy store less strongly are also acted on, in order to thus bring about the most efficient possible relief of the energy store, consumers of electrical energy in a hierarchy having hierarchy groups a), b), and c) can be acted upon successively in such a way that at least one consumer of electrical energy of the hierarchy group a) is acted upon first, if the load of the energy store is still excessive after acting upon at least one consumer of electrical energy of the hierarchy group a), at least one consumer of electrical energy of the hierarchy group b) is acted upon, and if the load of the energy store is still excessive after acting upon at least one consumer of electrical energy of the hierarchy group b), at least one consumer of electrical energy of the hierarchy group c) is acted upon, wherein the hierarchy groups a), b), and c) comprise the following consumers of electrical energy:

a) at least one electric motor of a traction hydraulic circuit driving at least one traction hydraulic pump, b) at least one unbalanced electric drive motor driving an unbalanced mass of an unbalanced assembly assigned to a soil processing roller, c) at least one small consumer of electrical energy, wherein the small consumers of electrical energy comprise: a cooler fan motor for cooling electronic components and/or a cooler fan motor for cooling hydraulic fluid and/or a seat heater and/or a control platform heater and/or an air conditioner and/or a water pump and/or an additive pump and/or a work light and/or a travel light and/or an audio system and/or a fresh air/recirculated air fan motor and/or a socket.

In an alternative relief strategy, the relevance of various consumers of electrical energy for the operation of a soil processing machine can be taken into consideration by successively acting upon consumers of electrical energy in a hierarchy having hierarchy groups e), f) and g) in such a way that initially at least one consumer of electrical energy of the hierarchy group e) is acted upon, if the load of the energy store is still excessive after acting upon at least one consumer of electrical energy of the hierarchy group e), at least one consumer of electrical energy of the hierarchy group f) is acted upon, and if the load of the energy store is still excessive after acting upon at least one consumer of electrical energy of the hierarchy group f), at least one consumer of electrical energy of the hierarchy group g) is acted upon, wherein the hierarchy groups e), f), and g) comprise the following consumers of electrical energy:

e) at least one small consumer of electrical energy, wherein the small consumers of electrical energy comprise: a cooler fan motor for cooling electronic components and/or a cooler fan motor for cooling hydraulic fluid and/or a seat heater and/or a control platform heater and/or an air conditioner and/or a water pump and/or an additive pump and/or a work light and/or a travel light and/or an audio system and/or a fresh air/recirculated air fan motor and/or a socket.

f) at least one traction electric motor of a traction hydraulic circuit driving at least one traction hydraulic pump, g) at least one unbalanced electric drive motor driving an unbalanced mass of an unbalanced assembly assigned to a soil processing roller.

With such a strategy, consumers of electrical energy are first deactivated or reduced in their power consumption, which have less direct influence with regard to the desired result, i.e., for example, a compaction of soil to be achieved. Only when an action upon such consumers of electrical energy that are less relevant for the immediate work result does not lead to sufficient relief of the energy store are consumers of electrical energy that are more relevant for the work result successively accessed and acted upon in such a way that more extensive relief of the energy store is achieved.

The soil processing machine can comprise at least two soil processing rollers, each with an unbalanced assembly having at least one unbalanced mass drivable to rotate by at least one unbalanced electric drive motor, wherein when, with the unbalanced assemblies of the at least two soil processing rollers put in operation, the presence of a state of excessive load on the energy store is detected, the unbalanced assembly assigned to one of the soil processing rollers is deactivated or operated at a lower speed, and wherein if the load of the energy store is still excessive, the unbalanced assembly assigned to the other of the soil processing rollers is deactivated or operated at a lower speed.

Furthermore, it can be provided that the soil processing machine comprises at least two soil processing rollers, each having an unbalanced assembly having at least one unbalanced mass drivable to rotate by at least one unbalanced electric drive motor, wherein the unbalanced assembly assigned to one of the soil processing rollers has a vibration arrangement for generating a force acting substantially orthogonally to an axis of rotation of the one soil processing roller and the unbalanced assembly assigned to the other of the soil processing rollers comprises an oscillating arrangement for generating a force acting essentially tangentially to an axis of rotation of the other soil processing roller, wherein if, when the unbalanced assemblies of the at least two soil processing rollers are put into operation, the existence of a state of excessive load of the energy store is detected, the unbalanced assembly assigned to the other of the soil processing rollers is deactivated or operated at a lower speed, and wherein if the load on the energy store is still excessive, the unbalanced assembly assigned to the one of the soil processing rollers is deactivated or operated at a lower speed.

In a further embodiment, the soil processing machine can comprise at least one soil processing roller having an unbalanced assembly having at least one unbalanced mass drivable to rotate by at least one unbalanced electric drive motor, wherein the unbalanced assembly is operable in a vibration mode to generate a force acting essentially orthogonally to an axis of rotation of the soil processing roller and in an oscillation mode to generate a force acting essentially tangentially to an axis of rotation of the soil processing roller, wherein when the presence of an excessive load on the energy store is detected when the unbalanced assembly of the at least one soil processing roller is operated in oscillation mode, the oscillation mode of the unbalanced assembly is ended or continued at a lower speed, and/or when the presence of an excessive load on the energy store is detected when the unbalanced assembly of the at least one soil processing roller is operated in vibration mode, the vibration mode is ended or continued at a lower speed.

A fully electrically operated soil processing machine can comprise at least one traction electric motor of a traction hydraulic circuit driving at least one traction hydraulic pump and at least one steering electric motor of a steering hydraulic circuit driving at least one steering hydraulic pump. In order to prevent the occurrence of an overload state of the energy store in such a soil processing machine, at least one, preferably each, steering electric motor can be put into operation before at least one, preferably each, traction electric motor when starting up the soil processing machine. It is thus ensured, even when the energy store is relieved, that when the soil processing machine begins to move on the soil to be processed, there is also sufficient steering assistance or steerability of the soil processing machine.

In particular when the soil processing machine is constructed as a soil compactor, it can comprise at least one soil processing roller having an unbalanced assembly having at least one unbalanced mass drivable rotate by at least one unbalanced electric drive motor. To avoid an excessive load of the energy store, at least one, preferably each, traction electric motor can be put into operation before at least one, preferably each, unbalanced electric drive motor when the soil processing machine is started up.

In the method according to the invention, a state of charge of the energy store can also be registered and when the presence of a state of insufficient charge of the energy store is detected, at least one consumer of electrical energy can be deactivated and/or the power consumption of at least one consumer of electrical energy can be reduced.

The present invention is described in detail below with reference to the attached figures. In the figures.

Figure 1:
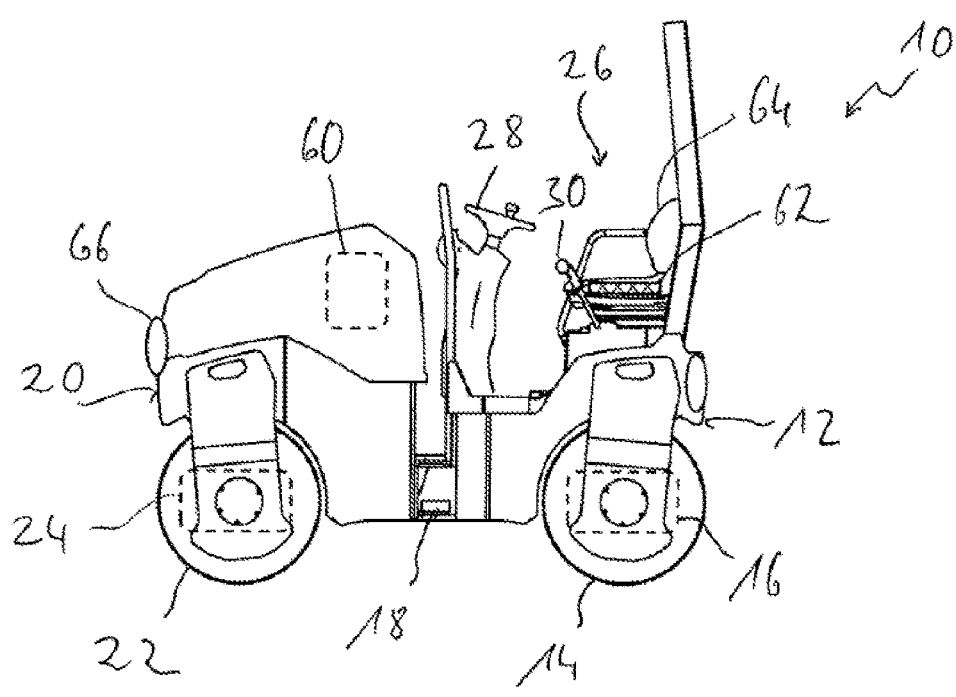
FIG. 1 shows a soil processing machine designed as a soil compactor.

The soil processing machine 10 shown in FIG. 1 and constructed as a soil compactor comprises a soil processing roller 14 on a rear carriage 12 having an unbalanced assembly 16 assigned to it and arranged at least partially in the same. On a front carriage 20, which is pivotably connected in an articulated connection region 18 to the rear carriage 12 to steer the soil processing machine 10, the soil processing machine 10 comprises a further soil processing roller 22 having an unbalanced assembly 24 assigned to it and arranged at least partially in the same. On the rear carriage 12 there is also a control station 26, which is open in the exemplary embodiment shown and from which an operator can operate, for example, a steering wheel 28 to steer the soil compactor and a drive lever 30 to specify the travel speed of the soil compactor either in a forward direction or a reverse direction.

Figure 2:
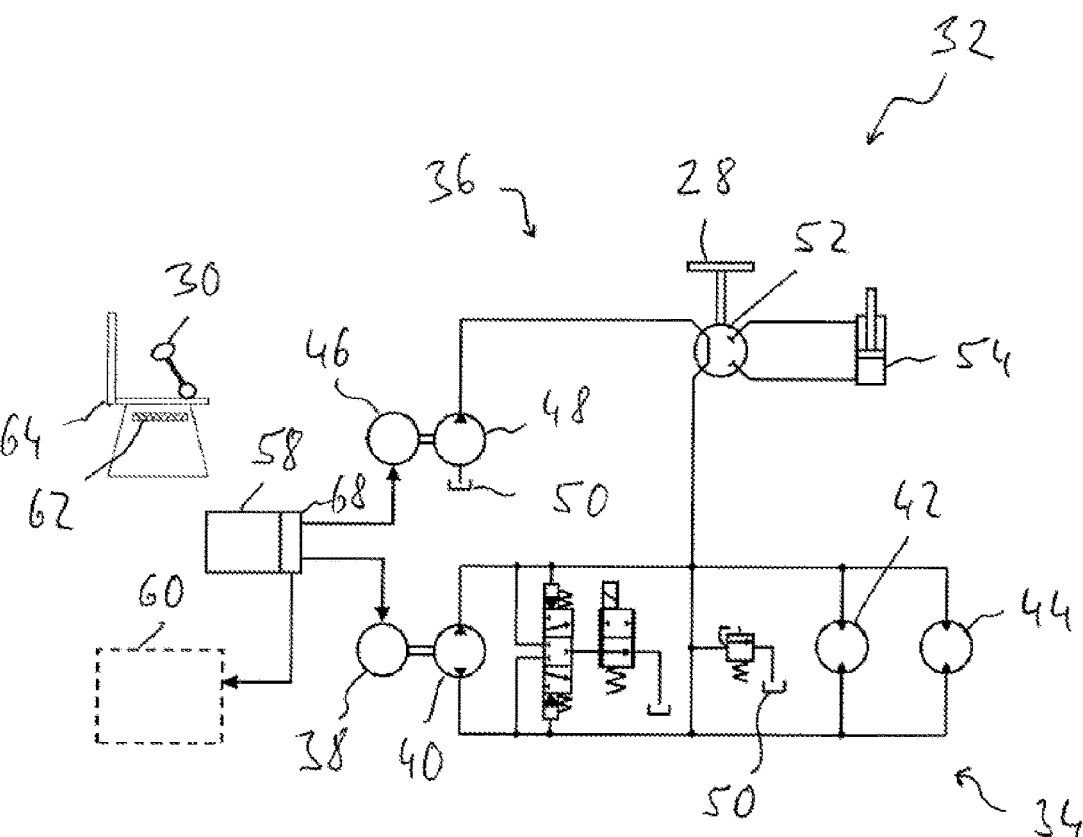
FIG. 2 shows a simplified representation of the structure of a hydraulic system of the soil processing machine of FIG. 2.

A hydraulic system 32 provided on the soil compactor 10 is shown in FIG. 2 in a simplified, schematic representation. The hydraulic system 32 comprises a traction hydraulic circuit 34 and a steering hydraulic circuit 36 as essential components.

The traction hydraulic circuit 34 comprises a traction hydraulic pump 40 driven by a traction electric motor 38 and two traction hydraulic motors 42, 44, wherein the traction hydraulic motor 42 can be assigned to the soil processing roller 14 provided on the rear carriage and the traction hydraulic motor 44 can be assigned to the soil processing roller 22 provided on the front carriage 20, to set them into rotation when the traction hydraulic pump 40 is operated by the traction electric motor 38.

The steering hydraulic circuit 36 comprises a steering hydraulic pump 48 driven by a steering electric motor 46. This conveys fluid, for example hydraulic oil, from a reservoir 50 to a steering assembly 52, which converts a rotary movement of the steering wheel 28 into an actuating movement of one or two steering piston/cylinder units 54 in order to thus pivot the front carriage 20 and the rear carriage 12 with respect to one another in the articulated connection region 18 and thus to steer the soil compactor 10. The fluid conveyed by the steering hydraulic pump 48 can be fed back into the reservoir 50 via the traction hydraulic circuit 34.

Figure 3:
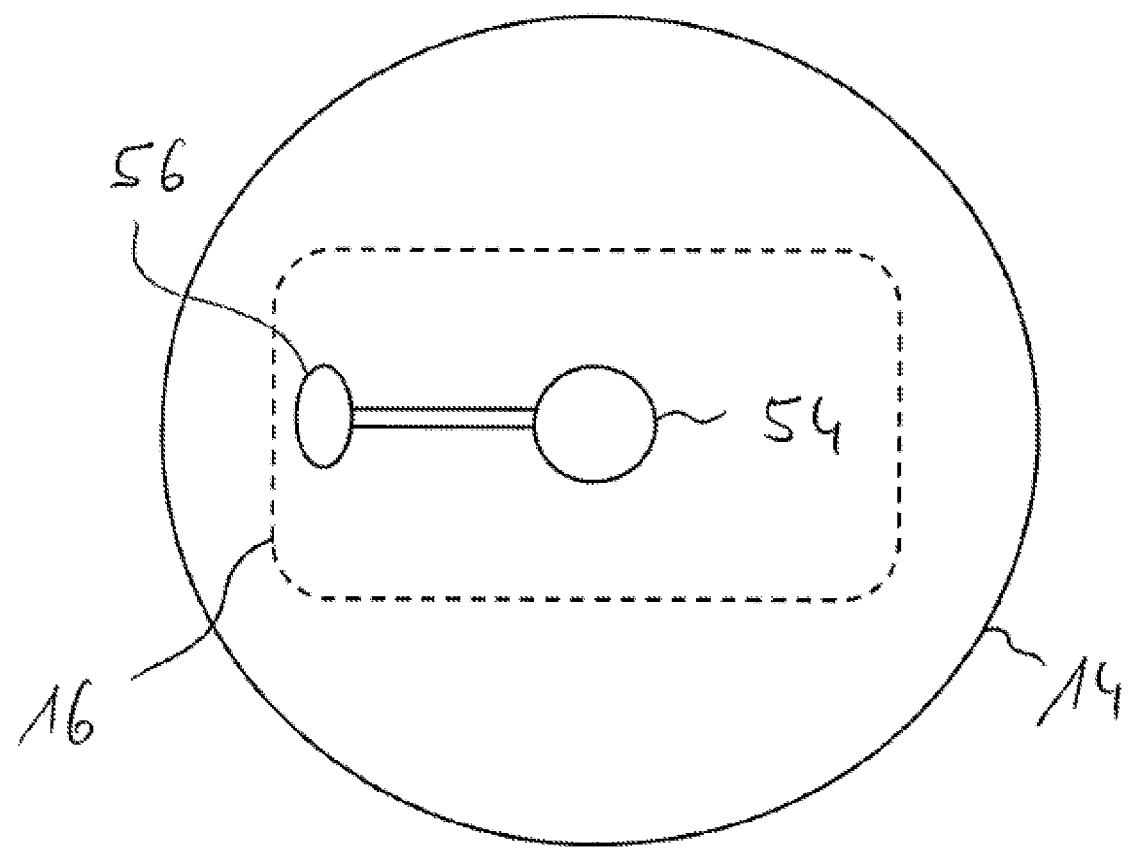
FIG. 3 shows an simplified form an unbalanced assembly assigned to a soil processing roller of the soil processing machine of FIG. 1.

In the hydraulic system 32, the traction electric motor 38 and the steering electric motor 46 represent consumers of electrical energy. Further consumers of electrical energy can be found in the unbalanced assemblies 16, 24. As illustrated by way of example using the unbalanced assembly 16 of the soil processing roller 14 in FIG. 3, each such unbalanced assembly comprises at least one unbalanced electric drive motor 54, which drives at least one unbalanced mass 56, which is designed with a center of mass M eccentric to an unbalanced axis of rotation U, to rotate around the unbalanced axis U. In the exemplary embodiment of an unbalanced assembly 16 illustrated in FIG. 3, the unbalanced axis of rotation U corresponds to the axis of rotation D of the soil processing roller 14, so that the unbalanced mass 56 rotating around the unbalanced axis U exerts a force oriented essentially orthogonally to the roller axis of rotation D on the soil processing roller 14 and this is thus set into a vibration movement. The unbalanced assembly 16 constructed or operable in this manner thus provides a vibration assembly.

In an alternative embodiment of such an unbalanced assembly 16, 24, at least two unbalanced masses can be provided having unbalanced axes of rotation that are offset with respect to the roller axis of rotation D and parallel thereto, wherein the unbalanced axis of rotation of these unbalanced masses can be arranged opposite to one another with respect to the roller axis of rotation D. Such unbalanced assemblies can be operated in such a way that they generate a force that is tangential to the axis of rotation of the roller and thus set the soil processing roller into an oscillation movement in which it is periodically accelerated or decelerated to rotate around the roller axis of rotation. In this case, the unbalanced assembly forms an oscillation assembly. Such an unbalanced assembly constructed having two or at least two unbalanced masses having unbalanced axes of rotation offset to the roller axis of rotation can alternatively also be operated in such a way that the rotating unbalanced masses generate a force directed orthogonally to the roller axis of rotation, so that in this case such an unbalanced assembly can be operated as a vibration assembly.

The unbalanced electric drive motor 54 of the unbalanced assembly 16 or each unbalanced electric drive motor 54 provided on the soil processing machine 10 provides a consumer of electrical energy which, like the traction electric motor 38 and the steering electric motor 46, is fed with electrical energy from an energy store 58, for example at least one battery. Further consumers of electrical energy are also fed with electrical energy from the energy store 58. These further consumers of electrical energy, which are denoted generally by 60 in FIGS. 1 and 2, can be generally denoted as small consumers, the energy consumption of which is comparatively low in particular in comparison to the energy consumption of the traction electric motor 38, the steering electric motor 46, or each unbalanced electric drive motor 54. Such small consumers 60 can comprise, for example, a seat heater 62 shown in FIGS. 1 and 2 on an operator seat 64 in the control platform 26 and can also comprise, for example, a cooler fan motor, by which a fan for cooling electronic components is driven. Furthermore, such small consumers 60 can comprise a control platform heater or an air conditioner, particularly in the case of a closed control platform 26. If a sprinkler system is provided on the soil processing machine 10 in association with at least one of soil processing rollers 14, 22, using which this roller can be sprinkled to prevent material to be compacted from adhering, the small consumers 60 can comprise a water pump or an additive pump, for example, by mixing water and liquid additive, to produce a mixture for sprinkling the surfaces of the soil processing rollers 14, 22 or to spray these liquids onto the surfaces of the soil processing rollers 14, 22. A travel light 66 shown in FIG. 1, which is required to be able to move the soil processing machine 10 on public roads, or special work lights to be able to better illuminate the work area, can also be provided as small consumers 60, as well as an audio system provided in the area of the control platform 26 or a socket, via which additional devices on the soil processing machine 10 can be supplied with electrical energy. A blower motor of a fresh air/recirculated air fan for the control platform 26 can also be provided as a small consumer 60, in particular if this is stand is closed.

Energy stores 58 designed as batteries, for example lithium-ion batteries, are only loadable to a limited extent during operation, which means that they can only be operated with a limited current flow of, for example, several 100 A. Higher current flows from such an energy store can lead to damage thereto and therefore have to be avoided. Nevertheless, states can occur in which the flow of current from the energy store 58 becomes too high and, for example, exceeds a threshold amperage, particularly when a large number of consumers of electrical energy are to be fed simultaneously from the energy store 58 in the soil compactor 10.

In order to be able to detect the occurrence of such states, a load monitoring arrangement 68 comprising a current sensor, for example, is assigned to the energy store 58 and outputs a signal corresponding to the current flow. This signal can be evaluated in a control unit of the soil compactor 10 and used as a basis for activating or operating the various consumers of electrical energy provided on the soil processing machine 10 in the manner described hereinafter.

When starting up the soil processing machine 10, to avoid an overload state of the energy store 58, the procedure can be such that in particular consumers of electrical energy, which have a high power consumption and contribute to a strong load of the energy store 58, i.e., a high current flow, are not put into operation at the same time. For example, it can be provided that when the soil processing machine 10 is to be put into operation, i.e., if, for example, work is to be carried out in a compaction mode, first the steering electric motor 46 is put into operation in order to provide sufficient fluid pressure in the steering hydraulic circuit 36 so that the steerability of the soil processing machine 10 is ensured. With a time delay from starting up the steering electric motor 46, the traction electric motor 38 can then be activated, i.e., a voltage can be applied to drive the traction hydraulic pump 40 and thus set the soil processing machine 10 in motion. Since a comparatively high current flow occurs particularly in phases in which the electric motors 46, 38 are put into operation, the time offset when activating the two electric motors 46, 38 ensures that their load peaks do not occur simultaneously.

If the soil processing machine 10 is then set in motion, the unbalanced electric drive motors 54 assigned to the unbalanced assemblies 16, 24 can also be excited. Here, for example, the procedure can be such that the unbalanced electric drive motors 54 provided for the two unbalanced assemblies 16, 24 are put into operation simultaneously. In order to avoid the simultaneous occurrence of load peaks in this phase as well, it can alternatively be provided that the unbalanced electric motors 54 provided for the two unbalanced assemblies 16, 24 are put into operation offset in time from one another, so that one of these unbalanced electric drive motors 54, for example, only is energized when the other of the unbalanced electric drive motors 54 is already rotating at a speed that is in the range of the target speed provided for the unbalanced mode. If one or both unbalanced assemblies 16, 24 have multiple unbalanced electric drive motors 54, these can also be put into operation offset to one another.

In this phase of starting up the soil compactor 10, in order to avoid load peaks on the energy store 58, electrical energy consumers of this type, which play a subordinate role in the operation of the soil compactor 10, can remain deactivated or be operated using a lower power consumption. This applies, for example, to the small consumers 60. For example, when the soil processing machine 10 is started up, there is no need to operate the seat heater 62 or to operate an air conditioner at full power.

If the soil processing machine 10 is in operation, i.e., if it is moving over the soil to be compacted in order to compact asphalt material, for example, it cannot be ruled out that a state will occur in which the current flow from the energy store 58 will reach or exceed the threshold amperage. This can be the case, for example, when the soil processing machine 10, which is initially moving on essentially horizontal ground, is moved into the area of a slope, i.e., is to be moved uphill. If the travel speed of the soil processing machine 10 is to be maintained in such a state, this can result in a substantial increase of the load of the energy store 58 exerted by the traction electric motor 38.

If such a state of excessive load on the energy store 58 occurs, which is detectable, for example, when the threshold amperage is reached or exceeded, various measures can be taken which reduce the load of the energy store 58. In particular, various strategies can be provided in order to reduce the load of the energy store 58.

For example, such a relief strategy can provide that measures are first taken using which a comparatively strong reduction in the load on the energy store 58 is achieved. Since, as stated above, it can generally be assumed that the traction electric motor 38 loads the energy store 58 the most, it is thus possible, for example, to act first in such a relief strategy on the traction electric motor 38 in order to reduce its speed and thus the speed at which the soil processing machine 10 moves over the soil to be processed. This lowering of the travel speed of the soil processing machine 10 can, for example, take place in multiple steps or continuously or continuously between individual steps, for example, down to a minimum travel speed which cannot be fallen below in order to achieve the desired processing result.

If the reduction in travel speed by appropriate activation of the electric drive motor 38 does not lead to the desired result, further system areas can then be activated in the hierarchy oriented to the power consumption in order to reduce the load of the electric accumulator 58. The unbalanced assemblies 16, 24 or their unbalanced electric drive motors 54 can be considered as such system areas, for example. If the load on the energy accumulator 58 is still excessive even at a reduced travel speed of the soil processing machine 10, the unbalanced mass arrangements 16, 24 can be acted upon in a next stage of relief. The procedure can be such that first one of the unbalanced assemblies is deactivated or its unbalanced mass 56 is driven at a lower speed to rotate around the assigned unbalanced axis of rotation U. If the reduction in the speed of one of the unbalanced assemblies 16, 24 does not lead to sufficient relief of the energy store 58 while the other unbalanced assembly continues to be operated normally, the unbalanced assembly which has already reduced its power consumption can then be completely deactivated, while the other unbalanced assembly can continue to be operated normally, or the power consumption of the other unbalanced assembly can also be reduced and its unbalanced mass 56 can be driven at a reduced speed. This reduction in the power consumption in one or in both unbalanced assemblies 16, 24 can optionally also take place in multiple steps. If the reduction of the power consumption or the deactivation of one of the unbalanced assemblies 16, 24 does not lead to a sufficient relief of the energy store 58, the other unbalanced assembly can also be deactivated or its power consumption can be reduced, so that at least temporarily none of the unbalanced assemblies 16, 24 is operated and none of the soil processing rollers 14, 22 is set into a vibrational movement.

In a further variant, unbalanced assemblies 16, 24 could be provided in both soil processing rollers 14, 22, which could be operated both in oscillation mode and in vibration mode. In this case, to reduce the load on the energy store 58, when one of the unbalanced assemblies 16, 24 is being operated in oscillation mode, in this case the oscillation mode can be continued, for example at a reduced speed, while the unbalanced assembly of the respective other soil processing roller continues to be operated unchanged in vibration mode. If the relief of the energy store 58 introduced as a result is also not sufficient, the oscillation mode can be ended while the vibration mode is initially maintained in the other soil processing roller. To further relieve the energy store 58, this vibration mode can also be continued at a reduced speed, and if this does not lead to sufficient relief of the energy store 58, the unbalanced assembly initially still being operated in the vibration mode can also be completely deactivated. In principle, the power consumption of the unbalanced assembly working in vibration mode can also be successively reduced before the unbalanced assembly working in oscillation mode is also acted upon to reduce the power consumption.

If this action provided in a second step of the relief hierarchy does not lead to sufficient relief of the energy store 58, in particular on the various unbalanced assemblies, the small consumers 60 can be acted upon in a third step of the relief hierarchy in order, by deactivating at least a part of the small consumers 60 and/or by reducing the power consumption of at least a part of the small consumers 60, to further reduce the current flow from the energy store 58.

In an alternative strategy for relieving the energy store 58, the priority with regard to the action upon various consumers of electrical energy cannot be performed on the basis of the respective contribution to the relief achieved, but rather on the basis of the relevance of a respective consumer for the mode to be carried out. If, for example, soil is to be compacted using the soil processing machine 10, then a sufficient speed in the respective unbalanced assemblies 16,

24 and a sufficient travel speed of soil processing machine 10 are of overriding importance, while for example sufficient heating of the control platform 26 or complete illumination of the soil to be processed are of secondary importance. With such a prioritization, it can be provided, for example, that when an overload state of the energy store 58 is detected, the small consumers 60 are acted upon first and, insofar as they are not absolutely necessary for operation, are deactivated or their power consumption is reduced. For example, a cooler fan motor can be operated at a lower speed, as can a fan motor for a fresh air/recirculated air fan. A seat heater or a heater for the control platform can also be deactivated or operated with a lower power consumption in a first step of the relief hierarchy, since they are not directly relevant to the desired work result.

If this first step of the relief does not lead to sufficient relief of the energy storage device 58, the traction electric motor 38 can be acted upon in a second step of this relief hierarchy in order to also reduce its power consumption and, accompanying this, the travel speed of the soil processing machine 10 by reducing its speed. This makes a substantial contribution to relieving the energy store 58.

Since the travel speed of the soil processing machine 10 is generally less important for the work result than the operation of the unbalanced assembly 16, 24, the unbalanced assemblies 16, 24 are only acted upon, for example in the manner explained in detail above, in a third step of the relief hierarchy, if the reduction of the travel speed, i.e., the action upon the traction electric motor 38, has not yet contributed to a sufficient relief of the energy store 58.

Various measures have been described above, which can be used individually or in combination, preferably in a defined coordinated manner, in order not to excessively load the energy store 58 feeding the various consumers of electrical energy during operation of a soil processing machine 10, or to relieve it again if an overload state has occurred. These measures are preferably taken in a coordinated manner within the framework of the hierarchies presented above, but can of course also be taken as desired, for example by manual interaction of an operator, if a respective operating state of the soil processing machine 10 makes this seem advantageous.

The measures to be taken according to the invention for relieving an energy store can be applied to the greatly varying soil processing machines or soil compactors. As shown in FIG. 1, such a soil processing machine can have two soil processing rollers arranged in succession in a longitudinal direction thereof. Alternatively, such a soil processing machine can have a soil processing roller only on the front carriage, for example, while drive wheels are provided on the rear carriage. Rubber-wheeled rollers rotatable around a common axis of rotation can also be provided as soil processing rollers, and two soil processing rollers constructed with a metal casing can be arranged adjacent to one another, i.e., in succession in the direction of a roller axis of rotation.

The invention claimed is:

1. A method for operating a soil processing machine, wherein the soil processing machine comprises a plurality of consumers of electrical energy fed from an energy store, the method comprising:

detecting a load state of the energy store and then, when the presence of a state of excessive load of the energy store is detected, deactivating at least one consumer of electrical energy and/or reducing the power consumption of at least one consumer of electrical energy, wherein:

if a state of excessive load of the energy store is present, in accordance with a relief strategy taking into consideration the power consumption of consumers of electrical energy, consumers of electrical energy having decreasing power consumption can be successively deactivated and/or consumers of electrical energy having decreasing power consumption can be successively reduced in their power consumption, in such a way that consumers of electrical energy having higher power consumption are acted upon first and consumers of electrical energy having lower power consumption are acted upon if the load of the energy store is still excessive.

2. The method as claimed in claim 1, further including:

registering a current flow from the energy store is registered, wherein the presence of a state of excessive load on the energy store is detected when an amperage of the current flow from the energy store is above a threshold amperage.

3. The method as claimed in claim 1, wherein if, after deactivating at least one consumer of electrical energy and/or reducing the power consumption of at least one consumer of electrical energy, the presence of a state of excessive load of the energy store is still detected, at least one further consumer of electrical energy is deactivated and/or the power consumption of at least one further consumer of electrical energy is reduced.

4. The method as claimed in claim 1, wherein in a relief strategy taking into consideration the relevance of different consumers of electrical energy for the operation of a soil processing machine, consumers of electrical energy in a hierarchy having hierarchy groups a), b), and c) are successively acted upon in such a way that initially at least one consumer of electrical energy of the hierarchical group a) is acted upon, if the load of the energy store is still excessive after acting upon at least one consumer of electrical energy of the hierarchy group a), at least one consumer of electrical energy of the hierarchy group b) is acted upon, and if the load of the energy store is still excessive after acting upon at least one consumer of electrical energy of the hierarchy group b), at least one consumer of electrical energy of the hierarchy group c) is acted upon, wherein the hierarchy groups a), b), and c) comprise the following consumers of electrical energy:

a) at least one traction electric motor of a traction hydraulic circuit driving at least one traction hydraulic pump, b) at least one unbalanced electric drive motor driving an unbalanced mass of an unbalanced assembly assigned to a soil processing roller, c) at least one small consumer of electrical energy, wherein the small consumers of electrical energy comprise: a cooler fan motor for cooling electronic components and/or a cooler fan motor for cooling hydraulic fluid and/or a seat heater and/or a control platform heater and/or an air conditioner and/or a water pump and/or an additive pump and/or a work light and/or a travel light and/or an audio system and/or a fresh air/recirculated air fan motor and/or a socket.

5. The method as claimed in claim 1, wherein the soil processing machine comprises at least two soil processing rollers, each having an unbalanced assembly having at least one unbalanced mass drivable to rotate by at least one unbalanced electric drive motor, wherein when, with the unbalanced assemblies of the at least two soil processing rollers put into operation, the presence of a state of excessive load on the energy store is detected, the unbalanced assembly assigned to one of the soil processing rollers is deactivated or operated at a lower speed, and wherein if the load of the energy store is still excessive, the unbalanced assembly assigned to the other of the soil processing rollers is deactivated or operated at a lower speed.

6. The method as claimed in claim 1,
wherein the soil processing machine comprises at least two soil processing rollers, each having an unbalanced assembly having at least one unbalanced mass drivable to rotate by at least one unbalanced electric drive motor, wherein the unbalanced assembly assigned to one of the soil processing rollers comprises a vibration arrangement for generating a force acting substantially orthogonally to an axis of rotation of the one soil processing roller and the unbalanced assembly assigned to the other of the soil processing rollers comprises an oscillation arrangement for generating a force acting essentially tangentially to an axis of rotation of the other soil processing roller, wherein if, when the unbalanced assemblies of the at least two soil processing rollers are put into operation, the existence of a state of excessive load of the energy store is detected, the unbalanced assembly assigned to the other of the soil processing rollers is deactivated or operated at a lower speed, and wherein if the load on the energy store is still excessive, the unbalanced assembly assigned to the one of the soil processing rollers is deactivated or operated at a lower speed.

7. The method as claimed in claim 1,
wherein the soil processing machine comprises at least one soil processing roller having an unbalanced assembly having at least one unbalanced mass drivable to rotate by at least one unbalanced electric drive motor, wherein the unbalanced assembly is operable in a vibration mode to generate a force acting essentially orthogonally to an axis of rotation of the soil processing roller and in an oscillation mode to generate a force acting essentially tangentially to an axis of rotation of the soil processing roller, wherein when the presence of a state of excessive load on the energy store is detected when the unbalanced assembly of the at least one soil processing roller is operated in oscillation mode, the oscillation mode of the unbalanced assembly is ended or continued at a lower speed, and/or when the presence of an excessive load on the energy store is detected when the unbalanced assembly of the at least one soil processing roller is operated in vibration mode, the vibration mode is ended or continued at a lower speed.

8. The method as claimed in claim 1,
wherein a state of charge of the energy store is registered and when the presence of a state of insufficient charge of the energy store is detected, at least one consumer of electrical energy is deactivated and/or the power consumption of at least one consumer of electrical energy is reduced.

9. The method as claimed in claim 1, further including:
putting consumers of electrical energy into operation with a time delay to avoid entering into a state of excessive load of the energy store.

10. The method as claimed in claim 9,
wherein the soil processing machine comprises at least one traction electric motor driving at least one traction hydraulic pump of a traction hydraulic circuit and at least one steering electric motor driving at least one steering hydraulic pump of a steering hydraulic circuit, wherein when the soil processing machine is started up, at least one steering electric motor is put into operation before at least one driving electric motor.

11. The method as claimed in claim 10,
wherein the soil processing machine comprises at least one soil processing roller having an unbalanced assembly having at least one unbalanced mass drivable to rotate by at least one unbalanced electric drive motor, wherein when the soil processing machine is started up, at least one traction electric motor is put into operation before at least one unbalanced electric drive motor.

\* \* \* \* \*